United States Patent [19]

Anderson

[11] Patent Number: 4,999,911
[45] Date of Patent: Mar. 19, 1991

[54] METHOD OF MANUFACTURING AN AUTOMOBILE VALVE FOR USE IN REBUILDING ENGINES

[75] Inventor: Douglas R. Anderson, Plano, Tex.

[73] Assignee: Enginetech, Inc., Dallas, Tex.

[21] Appl. No.: 454,726

[22] Filed: Dec. 19, 1989

[51] Int. Cl.⁵ .............................................. B23P 7/00
[52] U.S. Cl. ............................. 29/888.42; 29/402.02; 29/402.06; 29/888.44; 29/888.46; 123/188 A
[58] Field of Search ........... 29/888.42, 888.41, 888.44, 29/888.46, 402.02, 402.02; 123/188 A, 188 R

[56] References Cited

U.S. PATENT DOCUMENTS

| | | | |
|---|---|---|---|
| 2,052,101 | 8/1936 | Miller | 29/888.42 |
| 2,069,933 | 2/1937 | Albertson | 29/888.42 |
| 2,275,310 | 3/1942 | Nuttall | 29/888.42 |
| 3,258,838 | 7/1966 | Tilton, Jr. | 29/888.42 |
| 3,344,501 | 10/1967 | Kulzer | 29/888.42 |
| 3,487,823 | 1/1970 | Tarter et al. | 29/888.44 |
| 3,802,055 | 4/1974 | Jackson | 29/888.42 |
| 3,828,415 | 8/1974 | Kammeraad et al. | 29/888.42 |
| 3,828,756 | 8/1974 | Kammeraad et al. | 29/888.42 |

Primary Examiner—Howard N. Goldberg
Assistant Examiner—D. Cuda
Attorney, Agent, or Firm—Ross, Howison, Clapp & Korn

[57] ABSTRACT

A method and apparatus for remanufacturing a valve seat includes providing a valve having an oversize valve head (52) and an oversize valve stem (80). The oversize valve head has a seating surface (60) which rides higher in the valve seat (34) after resurfacing thereof. The seating surface (60) on the valve head (58) therefore rides higher on the new seating surface (66) in the valve seat (34). The oversize valve stem (80) accommodates a bored out valve guide (78) to allow a single size valve stem to be utilized. A keeper grove (84) is disposed on the upper end of the oversize valve stem (80) and dimensioned such that it is disposed a predetermined distance below the original dimension of a standard valve. This allows a predetermined amount of compression to be placed onto the valve spring (28) to account for fatigue therein.

7 Claims, 4 Drawing Sheets

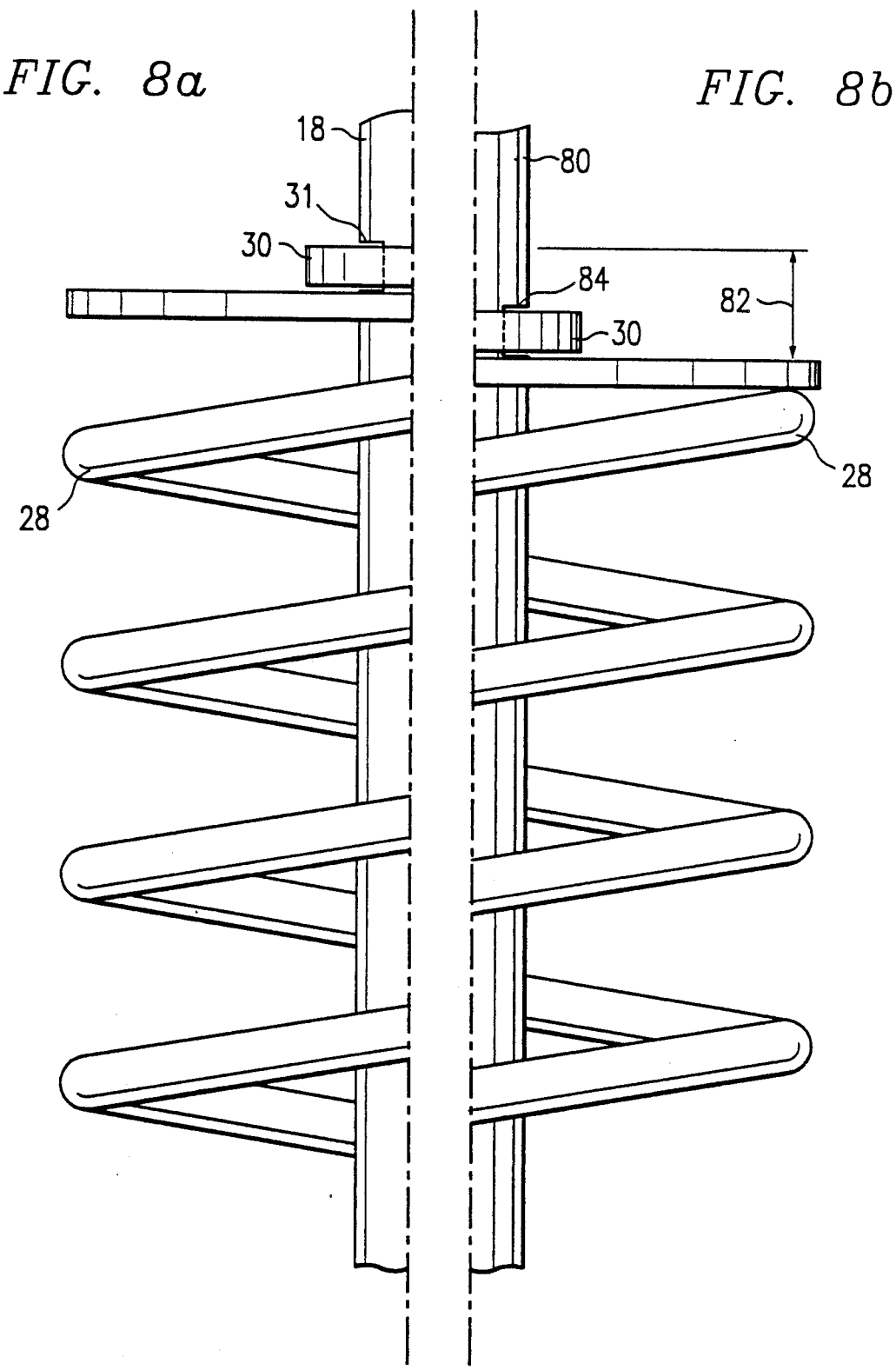

METHOD OF MANUFACTURING AN AUTOMOBILE VALVE FOR USE IN REBUILDING ENGINES

TECHNICAL FIELD OF THE INVENTION

The present invention pertains in general to automobile valves, and more particularly, to a method for standardizing a valve utilized in the rebuilding of automobile engines.

BACKGROUND OF THE INVENTION

When an automobile is initially assembled at the factory, all the parts have a predefined manufacturing tolerance and therefore the interface between various moving parts can be predicted. However, after an engine has been utilized for some time, these parts wear and go out of tolerance. This wear usually results in failure of the engine.

When remanufacturing an engine, it is necessary to replace worn parts. However, the replacement parts typically are dimensioned to accommodate the overall wear of the engine. For example, when a valve guide is worn, it becomes somewhat enlarged along the central axis thereof. If a valve stem having the original manufacturer's tolerance were installed into the remanufactured engine, the space between the exterior surface of the valve stem and the interior surface of the valve guide would exceed acceptable tolerances. Therefore, some accommodation must be made for the various wearing surfaces and the cooperating relationship therebetween in the remanufactured engine.

Valves in particular on the remanufactured engine present some unique problems in that failure to meet acceptable tolerances can result in poor heat transfer, excessive oil consumption, etc. There are three key items of consideration with respect to the valve in a remanufactured engine. First, it is essential to ensure that the valve in a remanufactured engine properly seats in the head and that the valve seat itself is ground to acceptable tolerances to provide a smooth mating surface for the valve. The valve head must have a smooth mating surface to provide proper seating. Second, the valve stem and the valve guide must interface such that there is approximately between a 0.0015 to 0.003 inch clearance between the exterior surface of the valve stem and the interior surface of the valve guide. Further, it is necessary that heat be transferred from the valve guide to the head. Third, the keeper groove at the upper end of the valve stem defines the securing position for compressing the valve spring. If the position of the keeper groove relative to the exterior of the head is altered from that of the original manufactured engine, this will result in the valve spring having too little compression or too much compression.

When regrinding a valve seat, it is important to remove a sufficient amount of the seating surface to provide a smooth polished surface. Depending upon the degradation of this surface, the seat may have to be lowered into the head too great a distance. Since this would result in the new or remanufactured valve sitting too far into the head and also result in removal of too much of the seat, the solution would be to remove a larger portion of the seat and replace it with a cast iron donut insert. This is a relatively expensive procedure.

When a valve guide wears, prior procedures have required boring out the valve guide and inserting a liner which has an inner diameter sized to provide the appropriate tolerances with the valve stem. Of course, the appropriate valve stem must be selected to be mated with the new liner. The problem with utilizing some types of liners or inserts is that the liner is typically pressed into the bored out valve guide. Although this press fit is relatively tight, heat transfer through the new liner is somewhat impeded. This is due to the fact that the interface between the exterior surface of the liner and the interior surface of the bored out valve guide is poor.

To accommodate variations in the height of the keeper groove at the end of the valve stem above the engine head, shims are typically utilized. One purpose for shims is to account for the "deterioration" or set of the valve spring and thus provide more spring tension. In addition, the shims also account for grinding of the valve seat wherein the head of the valve will recede into the valve seat. This directly translates to the keeper groove rising above the engine head.

One problem that exists at present with remanufacturing engines and especially with the valves is that generally there is no standardized value for rebuilding and only standard valves are available. Therefore, it is necessary to utilize the above rebuilding techniques with unique tooling for each engine in many cases to accommodate these various standardized valves.

SUMMARY OF THE INVENTION

The present invention disclosed and claimed herein comprises a method and apparatus for remanufacturing a valve assembly. The valve assembly includes a valve seat, a valve with a valve head and a valve stem, a valve guide through which the valve stem reciprocates, a valve spring and a retainer for the valve spring disposed in a keeper groove at the end of the valve stem and a valve stem seal. The replacement valve includes a valve head that has a diameter at the seating surface thereof that exceeds the corresponding diameter on the valve in the original valve assembly. The seating surface of the valve seat is resurfaced to increase the diameter of the seating surface at the upper end thereof. When the valve head having the larger diameter is disposed in the resurfaced valve seat, it rides higher in the resurfaced valve seat than would an original valve in the same remanufactured valve seat.

In another aspect of the present invention, the replacement valve includes a valve stem that has a diameter that exceeds that of an original valve stem. The valve guide is bored out to a predetermined dimension that exceeds the normal wear that would be expected on the valve guide in the original valve assembly. The valve stem on the replacement valve is dimensioned such that a clearance is formed between the bored out valve guide and the replacement valve stem, approximating the clearance in the original valve assembly.

In yet another aspect of the present invention, a modified keeper groove is provided on the end of the valve stem with the dimension between the modified keeper groove and the valve head being less than the corresponding dimension on the original valve. As such, a predetermined additional amount of compression is imparted to the valve spring when the replacement valve is assembled into the valve assembly.

BRIEF DESCRIPTION OF THE DRAWINGS

For a more complete understanding of the present invention and the advantages thereof, reference is now made to the following description taken in conjunction with the accompanying Drawings in which:

FIGS. 8 a and b illustrates the relationship of the keeper groove for both a prior art system and for the valve of the present invention.

DETAILED DESCRIPTION OF THE INVENTION

Figure 1:
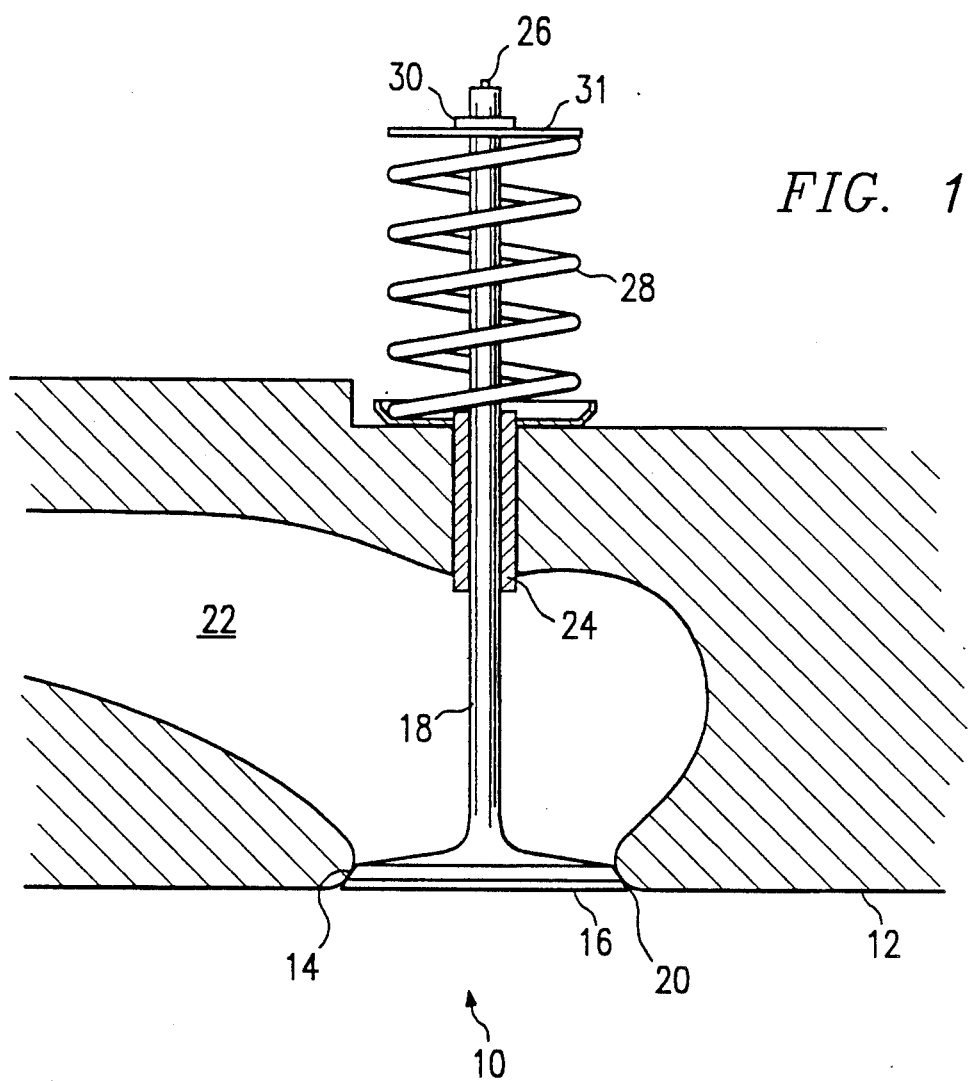
FIG. 1 illustrates a cross-sectional view of a valve seated against the valve seat.

Referring now to FIG. 1, there is illustrated a cross-sectional diagram of a typical valve in a cylinder head. A throat 10 is defined in the interior surface of a cylinder head 12. The throat 10 is circular shaped and has a valve seat 14 disposed on the peripheral edges thereof. A valve head 16 is attached to a valve stem 18, the valve head 16 having a seating surface 20 on the peripheral edge thereof. The seating surface 20 is operable to interface with the seat 14 to seal the throat 10. The throat 10 communicates with a port 22 to either expel exhaust gases or to receive an air fuel mixture.

The valve stem 18 is operable to reciprocate within a valve guide 24 that is disposed in the cylinder head 12. The valve guide 24 is typically made of cast iron and provides adequate heat transfer to the cylinder head 12. Typically, the valve stem 18 is dimensioned to provide a gap with a clearance of approximately 0.003 inches between the exterior surface of the valve stem 18 and the interior surface of the valve guide 24. This clearance allows the valve stem 18 to reciprocate freely within the valve guide 24 while prohibiting oil from flowing through the gap. If the gap were significantly larger, this would result in oil passing down from the exterior of the head 12 into the port 22. Alternatively, if the gap were too small, this would result in seizing of the valve stem 18 within the valve guide 24. The flow of oil through the gap could be the result of gravity for overhead valve engines or the cylinder vacuum on the intake valve, and by the vacuum created by exhaust pulses on the exhaust valve.

The valve stem 18 has an upper end 26 which is operable to interact with one end of a rocker arm (not shown). The rocker arm is operable to force the valve head away from the cylinder head 12, thus opening the throat 10. A valve spring 28 is provided on the end of the valve stem 18 protruding from the valve guide 24. During assembly, the valve spring 28 is compressed such that a retaining member 30 can be inserted into a "keeper" groove 31 in the upper end of the valve stem 18. The pressure of the valve spring 28 is important to proper operation of the valve mechanism.

Figure 2:
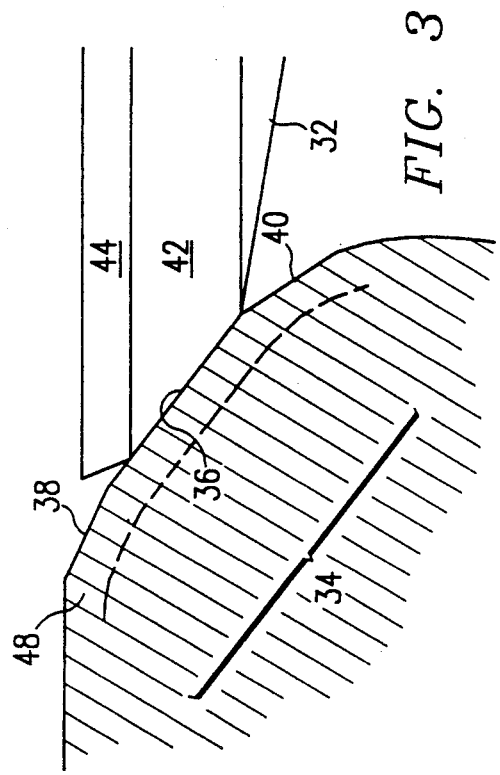
FIG. 2 illustrates a side view of the valve seat and the action of the valve thereagainst for a new valve and valve seat.

Referring now to FIG. 2, there is illustrated a detailed cross-section of a valve head 32 that interfaces with a seat 34 in a newly manufactured engine. In this configuration, the valve seat 34 conventionally has three surfaces, a seating surface 36 that is disposed at an angle of 45° with the horizontal, an upper surface 38 that is disposed at an angle of 30° with the horizontal and a lower surface 40 that is disposed at an angle of approximately 60° with the horizontal, the seating surface 36 disposed between the upper surface 38 and the lower surface 40. The valve head 32 has a seating surface 42 which is operable to seat against the seating surface 36 and an upper rim 44. The seating surface 42 is disposed at an angle with respect to the horizontal that is substantially equal to the angle of the seating surface 36, such that they form a seal when mated together. The rim 44 is disposed at an angle that is much greater than that of the seating surface 42.

When the cylinder head is manufactured, the portion of the metal forming the exhaust valve seat 34 is treated such that it is "hardened". This is represented by a region 48 which is indicated by a phantom line. The region 48 is approximately 0.015 to 0.060 inches thick and provides a relatively "hard" surface. Since the surface of the valve seat 34 is subjected to high temperatures and high impact forces between the seating surface 36 and the seating surface 42, this region presents a much higher degree of resistance to wear as compared to other surfaces on the cylinder head 12.

Figure 3:
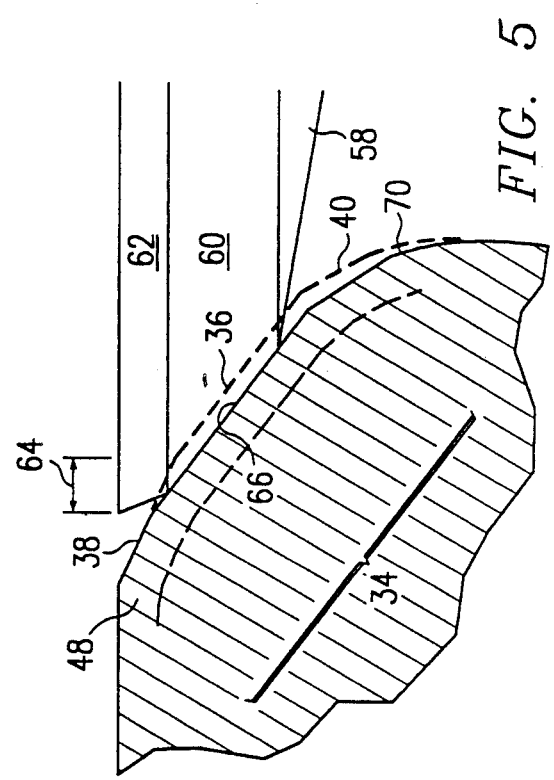
FIG. 3 illustrates the position of the valve after some wearing has taken place.

Referring now to FIG. 3, there is illustrated a cross-sectional diagram of the valve 32 and the valve seat 34 after wear. As the two seating surfaces 36 and 42 wear, the upper surface of the valve head 32 recedes downward into the valve seat 34 and downward along the seating surface 36 toward the lower surface 40. This is the result of the wearing away of the actual material that the valve seat 32 is comprised of. The result of this is that the valve stem associated with the valve head 32 rises outward from the cylinder head, thus relieving tension in the valve spring, which can eventually result in a poor seating operation. Further, damage can occur to the valve seat 36 as a result of this wear.

Figure 4:
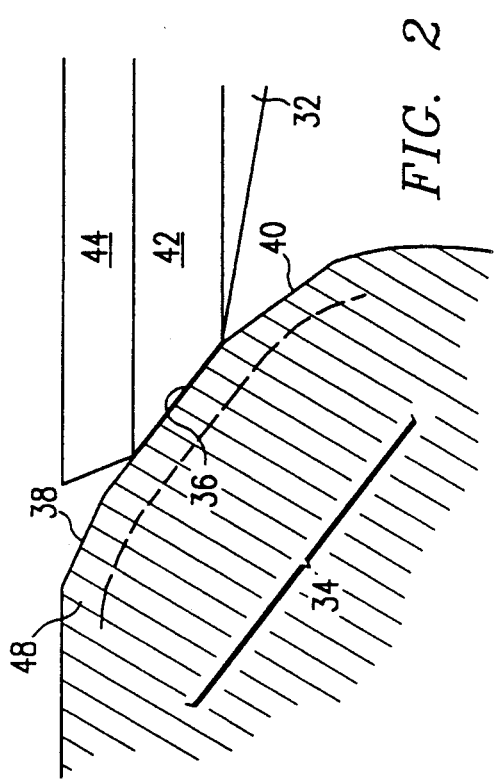
FIG. 4. illustrates a prior art method for remanufacturing the valve seat with a standard valve.

Referring now to FIG. 4, there is illustrated a cross-sectional detailed diagram of the prior art method for remanufacturing a valve seat 34, utilizing the same valve head 32. It is assumed that the valve head 32 is either new with dimensions that correspond to a new valve head or the seating surface 42 has been remachined. For the conventional remanufactured valve seat, the seating surface 34 is ground down at the same angle to result in a new seating surface 52. The new seating surface now extends downward into the region 48 such that the region 48 proximate to the new seating surface 52 is thinner than in the original cylinder head. Typically, the technician performing the grinding operation removes sufficient material to result in a smooth and shiny surface absent scratches or pits. If the amount of grinding required to achieve this condition is more than the remaining thickness of region 48, it will then be necessary to remove the entire seat 34 and put an insert in place thereof. Further, if the surface 52 results in the valve head 32 falling too far into the seat 34, it will also be necessary to utilize an insert.

When the new surface 52 is formed, this will result in the valve head 32 being slightly lower in the valve seat 34 by a dimension 54. This dimension 54 will also correspond to the additional height that the keeper groove on the end of the valve stem is above the surface of the cylinder head, thus resulting in the necessity for additional shims to provide adequate compression of the valve spring.

Figure 5A:
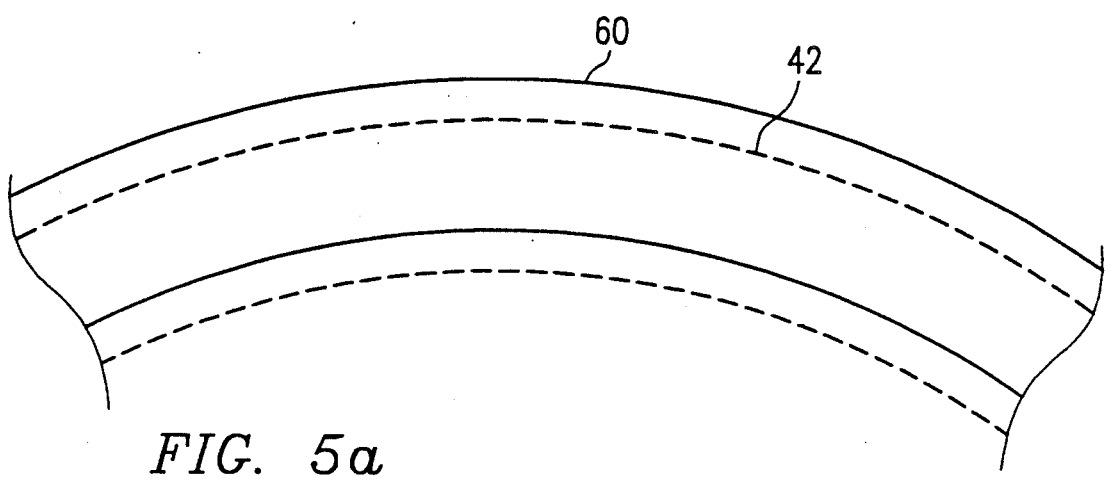
FIG. 5a illustrates a top view comparison between the remanufactured valve seat for the prior art and for the oversize valve.
Figure 5:
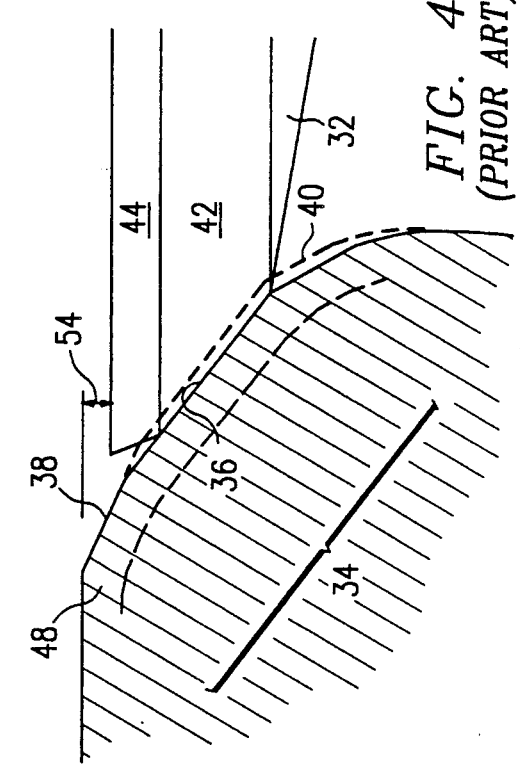
FIG. 5 illustrates the remanufactured valve seat utilizing the oversize valve of the present invention.

Referring now to FIG. 5, there is illustrated the preferred embodiment of the present invention utilizing an oversize valve head 58. The valve head 58 has a seating surface 60 similar to seating surface 42 and a rim 62 similar to the rim 44. The diameter of the valve head 58 is larger than the normal valve. In the preferred embodiment, the diameter is increased by a value of 0.030 inches. This results in a dimensional increase of 0.015 inches on the peripheral edge, as indicated by a dimension 64. Since the peripheral edge of the valve head 58 extends outward in the valve seat 34 an additional distance, the portion of the valve seat 34 upon which the seating surface 60 rests, the valve head 58 is in a closed position, will be higher than that with respect to the remanufactured valve of FIG. 4. Therefore, the original valve seating surface 36 need only be ground a sufficient amount to provide a smooth surface at a point closer to the upper portion of the upper surface 38. This results in a new seating surface 66.

It is important to note that the seating surface 60 is adjacent to a portion of the seating surface 66 that has a sufficiently greater amount of the region 48 disposed thereunder. This is the result of two factors. First, the portion of the original surface 36 in the valve seat 34 that is damaged is lower in the valve seat than that on which the seating surface 60 in the oversize valve 58 rests after remanufacturing the valve seat 34. Second, the upper surface of the valve head 58 proximate to the interior of the cylinder head is substantially in the original position as compared to a new cylinder head, as produced in the originally manufactured part. The result of this is that the keeper groove at the upper end of the valve stem diametrically opposite to the valve head 58 would be in the original position. If the keeper groove were placed in the same position on the end of the valve stem, this would result in the valve spring being disposed at the same position as that in the originally manufactured engine.

It can be seen by comparing FIGS. 4 and 5 that when utilizing the standard valve, it is necessary that the valve seat 34 be ground such that the surface 52 in FIG. 4 moves both in the horizontal and in the vertical direction. In the preferred embodiment of FIG. 5, the surface 36 is ground in the preferred embodiment such that the seating surface 66 of valve seat 34 moves substantially in the horizontal direction. This is due to the fact that the seating surface 60 of the valve moves in a horizontal direction due to the oversized valve head 58. In addition to grinding the original seating surface 36 to form the seating surface 66 in the valve seat 34, the lower surface 40 is also ground at the angle of 60° with respect to the horizontal to form a new lower surface 70.

Referring now to FIG. 5a, there is illustrated a comparison between both the prior art seating surface 42 in the embodiment of FIG. 4 and the seating surface 60 on the oversize valve 58 in the preferred embodiment of FIG. 5. It can be seen that the seating surface 60 sits farther up in the valve seat 34 than the seating surface 42 of the prior art embodiment. This is due to the increase in the diameter of the oversize valve head 58, also considering the fact that the angle of the final seating surfaces 52 and 66 is the same.

Figure 6:
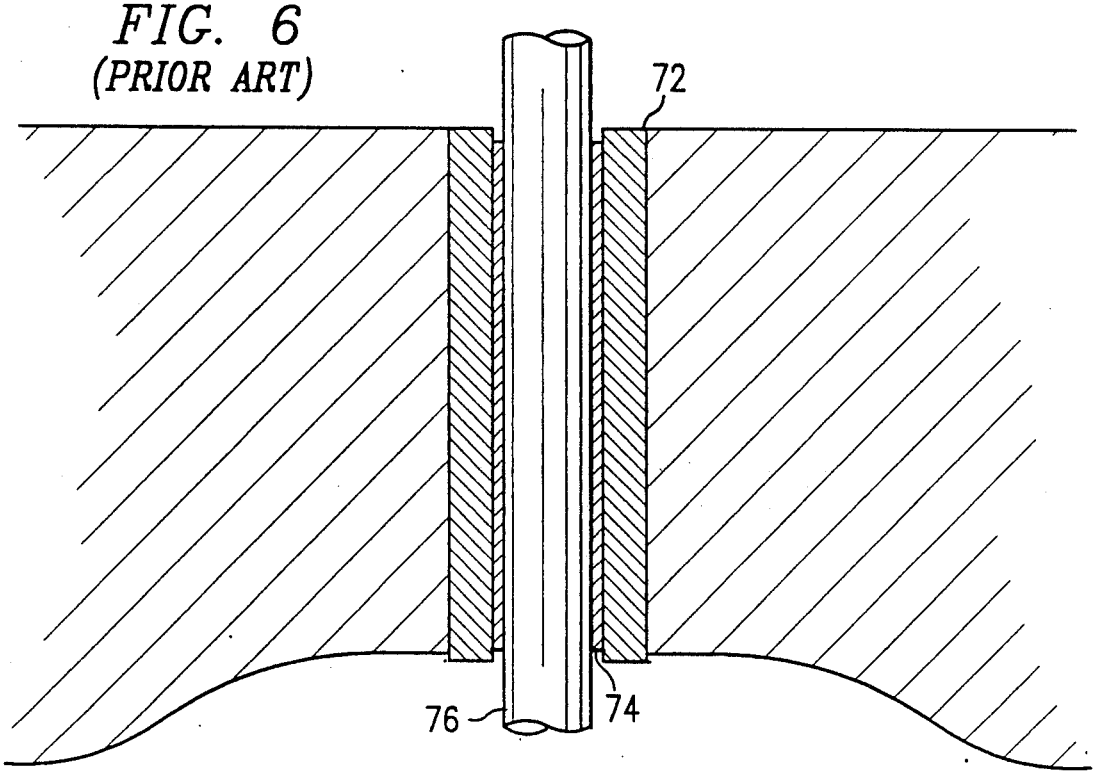
FIG. 6 illustrates a prior art method for remanufacturing the valve guide.

Referring now to FIG. 6, there is illustrated the prior art method for remanufacturing the valve guide. Since the original valve guide wears, it is necessary to bore the valve guide out to provide a modified valve guide 72. The modified valve guide 72 has an interior diameter that is too large for a standard valve stem. Therefore, a liner 74 is utilized which is press fit into the bored out valve guide 72 to provide an inner diameter dimension that is within tolerance. As described above, the tolerance is such that a 0.003 inch gap is provided between the exterior surface of a standard valve stem 76 and the interior surface of the liner 74. Some of the problems that exist with the liner 74 are the difficulty in assembling the final valve guide and also heat transfer between the liner 74 and the bored out valve guide 72.

Figure 7A:
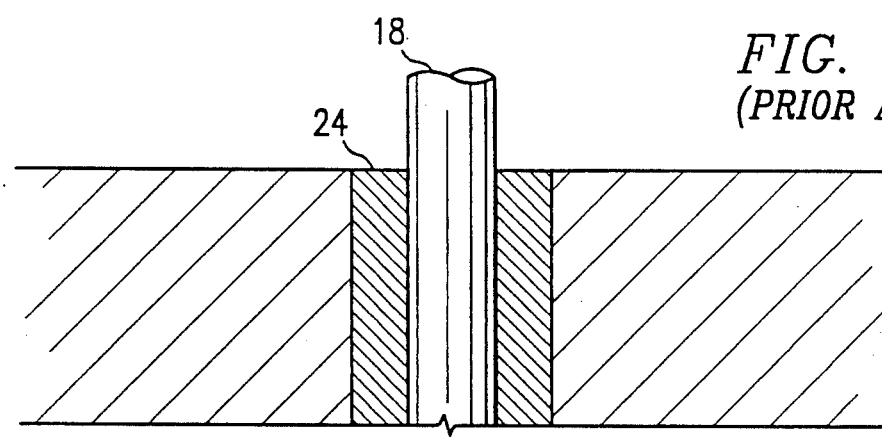
FIGS. 7 a and b illustrates the method of the present invention for remanufacturing the valve guide.
Figure 7B:
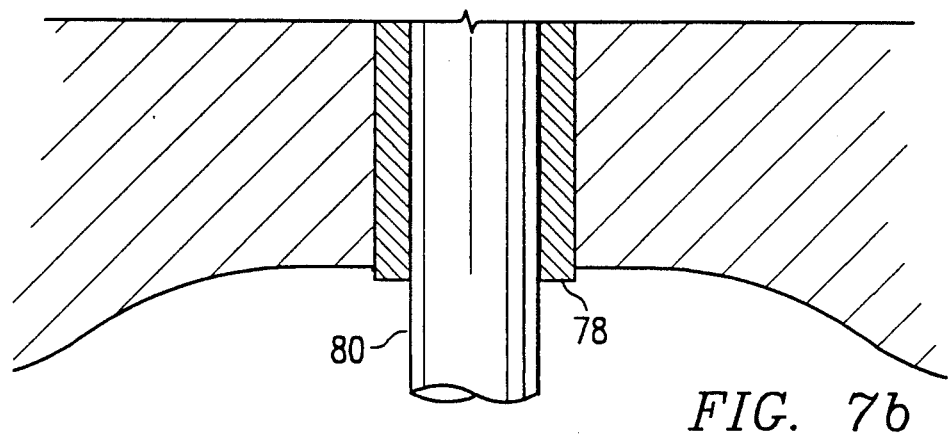

Referring now to FIG. 7, there is illustrated a preferred embodiment for providing a remanufactured valve guide. In the preferred embodiment of FIG. 7, the standard valve stem 18 and the standard valve guide 24 are illustrated in the upper portion of the Figure. In lower portion of FIG. 7, the bored out valve guide 78 and an oversize valve stem 80 are illustrated. In the method for remanufacturing the valve guide of the present invention, a single oversize valve stem is provided. In this manner, the original valve guide 24, is merely bored out to a dimension that will provide a concentric surface along the entire length of the remanufactured valve guide 78. The dimension of the interior diameter on the remanufactured valve guide 78 is defined by the reaming tool that is utilized. Therefore, this can be a very tight tolerance. The oversize valve stem 80 can then be standardized such that only one diameter valve stem is required. No insert or liner 74 is required and this dimension will be acceptable for all valve stems. The procedure therefore will be to ream the original valve guide 24 out to a predetermined dimension. In the preferred embodiment, this is approximately 0.015 inches over the standard inner diameter. Second, a standardized oversize valve stem is then provided on the replacement valve. As compared to the prior art method, this provides significantly fewer steps. Further, since the material of the original valve guide 24 is the same as that of the remanufactured valve guide 78, heat transfer is substantially identical to that in the original manufactured engine.

Referring now to FIG. 8, there is illustrated a detailed diagram of the placement of the keeper groove in the valve stem 80 as compared to the placement of the keeper groove 31 in the original valve stem 18. As described above, the upper end of the valve stem 80 when an oversize valve head 58 is associated therewith is at approximately the same position after regrinding the valve seat 34 as was the upper end of the original valve stem 18. As such, the same tension would be placed on the valve spring 28, were the valve spring 28 replaced with a new valve spring 28. However, if the old valve spring 28 is utilized, there will be some deterioration or set present as a result of use. Therefore, it is desirable to increase the compression at the valve spring. It has been determined empirically that the valve spring should be compressed approximately 0.030 inches. Therefore, a keeper groove 84 in the remanufactured valve spring is disposed lower by a factor of 0.030 inches to compensate for the set of the metal, as indicated by dimension 82. Therefore, the original retaining member 30 can be inserted into the keeper groove 84 in the remanufactured valve stem 80 that, when compared to the original keeper groove 31, is lower by a dimension of 0.030 inches in the preferred embodiment.

By utilizing the standard valve having the oversize valve head, the keeper groove 84 can be disposed at a predetermined position which will automatically provide a predetermined amount of tension on the valve spring 28. This is to be compared with the prior art system wherein shims would be required between the top of the spring 38 and the retaining member 30 to accomplish the same result. With the use of the oversize valve head, the location of the keeper groove 84 relative to the keeper groove 31 in the original valve stem 18 is known to within a predetermined tolerance.

In summary, there has been provided a method for simplifying the remanufacturing of a valve assembly. A single standardized valve is provided which has an oversize valve head with an increased diameter. This oversize valve head allows the seating surface on the valve head to ride higher in the remanufactured seat, thus requiring less removal of the valve seat in order to provide an adequate seating surface and also prevents the upper end of the valve stem from being disposed too high relative to the valve spring. The valve of the present invention also has an oversize valve stem which allows the original valve guide to be bored out to a predetermined dimension which will accept the oversize valve stem. This oversized valve stem exceeds all standard valve stems by a dimension that is slightly greater than normal wherein the valve guide can be bored out to a predetermined dimension. A keeper groove is disposed at a lower position on the upper end of the valve stem as compared to an original valve stem. This allows the old valve spring to be compressed by a predetermined amount without the requirement of shims.

Although the preferred embodiment has been described in detail, it should be understood that various changes, substitutions and alterations can be made therein without departing from the spirit and scope of the invention as defined by the appended claims.

What is claimed is:

1. A method for rebuilding a valve assembly in a remanufactured engine, the valve assembly including a valve seat, with a valve head and valve stem, a valve guide through which the valve guide reciprocates, a valve spring and a retainer for the valve spring disposed in a keeper groove at the end of the valve stem, comprising the steps of:
    resurfacing the seating surface on the valve seat to the angle of the original manufactured valve seat; and
    providing a replacement valve having a valve head with a standardized diameter that exceeds the diameter of the valve head on the valve in the original valve assembly and inserting the replacement valve in the resurfaced valve seat;
    wherein the replacement valve has a seating surface for mating with the seating surface on the resurfaced valve seat, the seating surface of the replacement valve riding higher on the seating surface of the resurfaced valve seat as compared to the point at which the seating surface on the valve in the original valve assembly would be disposed on the seating surface of the resurfaced valve seat.

2. The method of claim 1 and further comprising the steps of:
    boring the valve guide to a predetermined dimension that exceeds the normal wear on the original valve assembly such that the predetermined dimension exceeds the diameter of the valve guide on the original valve assembly; and
    providing on the replacement valve a valve stem that has a diameter less than the diameter of the bored out valve guide by a predetermined dimension such that a clearance is present therebetween, the clearance approximating the clearance in the original valve assembly;
    wherein the valve stem on the replacement valve has a diameter that exceeds the diameter of the valve stem in the original valve assembly.

3. The method of claim 1 and further comprising the step of providing a modified keeper groove on the end of the valve stem and having a dimension between the valve head and the keeper groove of the replacement valve that is less than the corresponding dimension of the valve in the original assembly between the valve head and the keeper groove, such that a predetermined amount of compression is imparted to the valve spring when assembled with the retainer disposed in the modified keeper groove.

4. The method of claim 3 and further comprising the steps of:
    boring the valve guide to a predetermined dimension that exceeds the normal wear on the original valve assembly such that the predetermined dimension exceeds the diameter of the valve guide on the original valve assembly; and
    providing on the replacement valve a valve stem that has a diameter less than the diameter of the bored out valve guide by a predetermined dimension such that a clearance is present therebetween, the clearance approximating the clearance in the original valve assembly;
    wherein the valve stem on the replacement valve has a diameter that exceeds the diameter of the valve stem in the original valve assembly.

5. A method for rebuilding a valve assembly in a remanufactured engine, the valve assembly including a valve seat, a valve with a valve head and valve stem, a valve guide through which the valve guide reciprocates, a valve spring and a retainer for the valve spring disposed in a keeper groove at the end of the valve stem, comprising the steps of:
    boring the valve guide in the original valve assembly after wear to a predetermined dimension that exceeds the expected normal wear on the original valve assembly; and
    providing a replacement valve having a valve stem with a diameter less than the diameter of the bored out valve guide by a predetermined dimension and inserting the replacement value in the valve assembly, such that a clearance is present therebetween approximating the clearance in the original valve assembly;
    wherein the valve stem on the replacement valve has a diameter that exceeds the diameter of the valve stem in the original valve assembly.

6. The method of claim 5 and further comprising the steps of:
    resurfacing the seating surface on the valve seat to the angle of the original manufactured valve seat; and
    providing on the replacement valve a valve head with a standardized diameter that exceeds the diameter of the valve head on the original valve in the original valve assembly;
    wherein the valve head on the replacement valve has a seating surface for mating with the seating surface on the resurfaced valve seat, the seating surface of the valve head on the replacement valve riding higher on the seating surface of the resurfaced valve seat as compared to the position that the original valve in the corresponding seating surface thereof with respect to the resurfaced valve seat.

7. The method of claim 6 and further comprising this step of providing a modified keeper groove on the end of the valve stem and having a dimension between the valve head and the keeper groove of the replacement valve that is less than the corresponding dimension of the valve in the original valve assembly between the valve head and the keeper groove such that a predetermined amount of compression is imparted to the valve spring when assembled with the retainer disposed in the modified keeper groove.

* * * * *